United States Patent [19]

Charles

[11] 4,354,396
[45] Oct. 19, 1982

[54] SPEED CHANGE MECHANISM WITH LOAD BEARING SADDLE

[75] Inventor: James A. Charles, Hagerstown, Ind.

[73] Assignee: Dana Corporation, Toledo, Ohio

[21] Appl. No.: 152,277

[22] Filed: May 22, 1980

[51] Int. Cl.³ .............................................. F16H 25/18
[52] U.S. Cl. .................................... 74/104; 74/89.15
[58] Field of Search ............... 74/104, 89.15, 424.8 R, 74/424.8 NA

[56] References Cited

U.S. PATENT DOCUMENTS

| | | | |
|---|---|---|---|
| 2,462,779 | 2/1949 | Russell | 74/365 |
| 2,715,217 | 8/1955 | Russell | 340/52 |
| 3,337,732 | 8/1967 | Opocensky | 74/424.8 R X |
| 3,507,192 | 4/1970 | Stokke | 74/104 X |
| 3,874,245 | 4/1974 | Kral et al. | 74/89.15 |
| 4,075,898 | 2/1978 | Carlson | 74/89.15 |
| 4,191,214 | 3/1980 | Holley et al. | 74/104 X |

FOREIGN PATENT DOCUMENTS

| | | | |
|---|---|---|---|
| 556588 | 4/1958 | Canada | 74/424.8 R |
| 671427 | 10/1963 | Canada | 74/424.8 R |

Primary Examiner—Rodney H. Bonck
Attorney, Agent, or Firm—Frank B. McDonald

[57] ABSTRACT

A speed change mechanism of the type having a gear change yoke actuated by a travelling ball nut on a screw includes a load-bearing saddle slidably mounted over the nut. The saddle provides for avoidance of radial loads on the nut and screw via the yoke, while allowing for transmission of axial loads between said members. The yoke moves between first and second limits of movement and contains a provision for relief of axial loads to the nut and screw whenever the yoke is positioned at either of said limits.

7 Claims, 6 Drawing Figures

SPEED CHANGE MECHANISM WITH LOAD BEARING SADDLE

BACKGROUND

This invention relates to mechanisms for changing gear speed ratios between selective values. More particularly, this invention relates to speed change mechanisms including gear change yokes actuated by travelling ball nuts on screw shafts.

Prior art devices of the type referenced herein are subject to frequent failures resulting from premature wear of the screw shaft. The latter is induced by freewheeling of the shaft at the end-stroke limits, whereupon the balls rub against the screw shafts as the screw shaft winds to a stop. This occurs because the screw shaft turns without effecting axial movement of the travelling ball nut. Resultant ball and screw wear progresses, the balls decreasing in size and contact stresses becoming even greater. Ultimate deterioration finally results in failure of the screw assembly to traverse, thus causing motor burn-out.

SUMMARY OF INVENTION

The invention disclosed herein avoids radial loads normally imposed by the actuator yoke on the drive screw shaft by transmitting such loads to a load bearing saddle positioned over the nut. The yoke geometry provides for relief of axial loading of the screw shaft during freewheeling of the shaft. Thus, in this manner, all loading of the nut and screw shaft normally realized during freewheeling is avoided, with the result that the balls of the ball-nut mechanism do not rub against the screw shaft.

Briefly, a preferred embodiment of the apparatus of the present invention includes the aforesaid load-bearing saddle which contains pins disposed for carrying all radial and axial loads. The pins engage slots in the yoke which incorporate escapement ramps by which the pins are free to slide out of the slots during freewheeling of the screw shaft. The saddle is restricted to radial movement relative to the nut by radially positioned flanges on the nut.

DETAILED DESCRIPTION OF PREFERRED EMBODIMENTS

Figure 1:
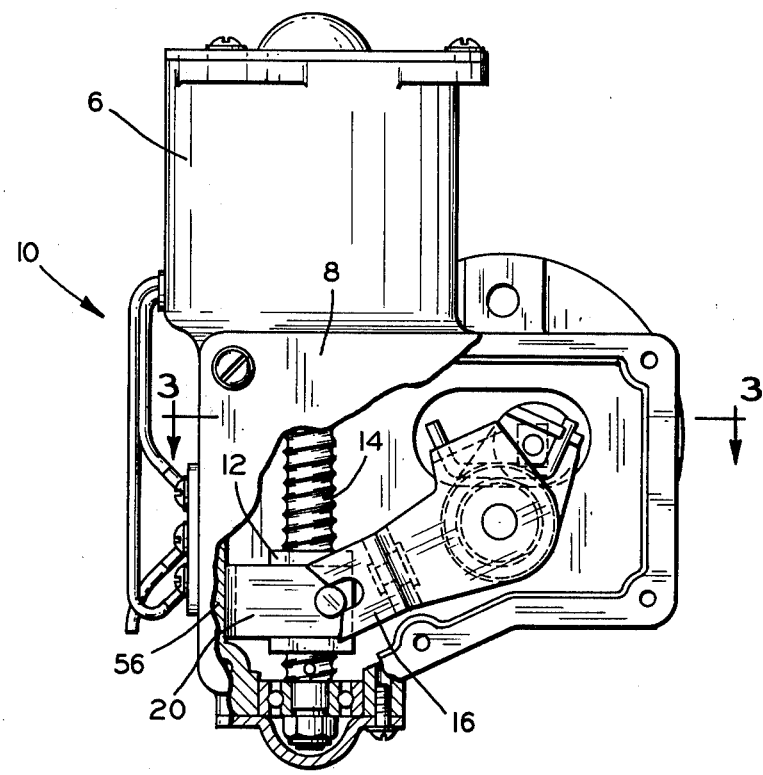
FIG. 1 is a side view of a speed change mechanism incorporating a preferred embodiment of this invention, broken in part to reveal the elements thereof.
Figure 2:
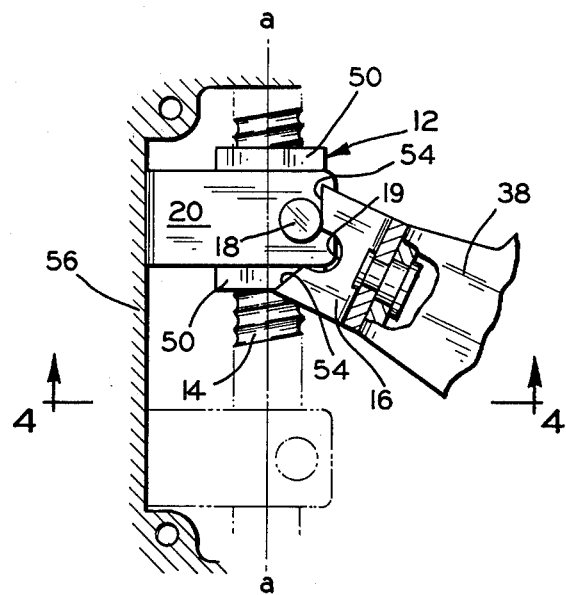
FIG. 2 is a fragmentary view of the nut, screw shaft, saddle, and yoke of the mechanism of FIG. 1.

A side view of a speed change mechanism which incorporates a preferred embodiment of this invention is shown in FIG. 1. Thus, a two-speed axle shift unit 10 has a portion of its casing 8 broken away to reveal a travelling ball nut 12, which moves axially but non-rotatably on a drive screw shaft 14 between two end limits. Drivescrew activation is via reversible electric motor 6. Referring to FIG. 2, the nut 12 induces movement of an actuator yoke 16 via pins 18, which engage slots 19 in the yoke 16. The pins 18 extend from opposite sides of a saddle 20 which is mounted radially over the nut 12 (see also FIG. 4). Integral flanges 50 (FIG. 6) at respective longitudinal ends of the nut 12 axially constrain the saddle 20 thereon, permitting only radial movement of the saddle with respect to the nut 12. Thus, as the nut 12 is conveyed axially between the shifter limits on the screw shaft 14, the pins 18 on the saddle 20 engage the slots 19 of the actuator yoke 16 and rotate the yoke from one shift position to the other. At the aforesaid end limits, the yoke has provision for allowing the escape of pins 18 from slots 19 for reasons and by means to be described hereinafter.

Figure 3:
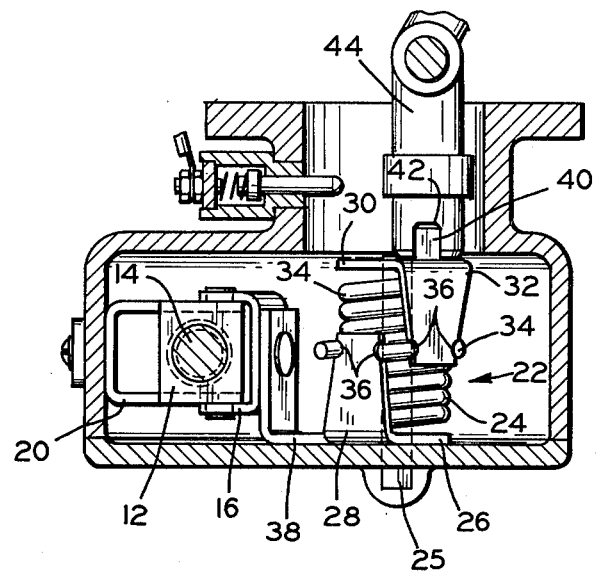
FIG. 3 is a sectional view along 3—3 of FIG. 1.

Referring now to FIG. 3, it will be seen that the travelling nut 12 will always affectuate movement of the yoke 16 against a spring force. Thus, a spring tensioning mechanism 22 includes a torsion spring 24 positioned on a lever shaft 25 (shown in phantom). The spring 24 is located intermediate a spring winding lever 26 and a shift fork actuating lever 30. The spring winding lever 26 includes an axially extending winding finger 28 at the outer extremity thereof, while the shift fork lever 30 includes axially extending and radially overlapping actuating finger 32. The spring 24 has opposite ends 34 which are bent radially outwardly so as to lie in the same radial plane and to be received in notches 36 of fingers 28 and 32. Thus, as the spring winding lever 26 is turned in either direction, the finger 28 will pass under the finger 32, and will engage either end 34 of the spring 24 and is thus able to apply a turning force thereto in either direction.

Figure 4:
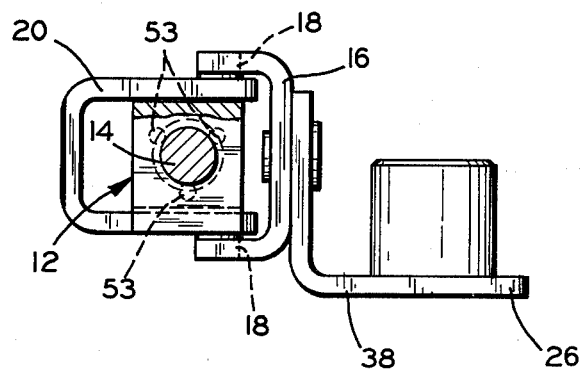
FIG. 4 is a view along 4—4 of FIG. 2.

Referring to FIG. 4, it will be seen that the spring winding lever 26 further includes an arm 38 to which is affixed the actuator yoke 16. Thus, it becomes evident that the axial movement of the nut 12 as induced by rotation of the screw 14 will cause the pins 18 of the saddle 20 (which engage slots 19 of yoke 16) to provide rotation of the yoke 16, arm 38, and hence the winding lever 26. Referring back to FIG. 3, the shift fork actuating lever 30 includes a rectangularly shaped collar 40 adapted for insertion into a socket 42 of a double-armed shift fork lever 44, which has a function which will without explanation be appreciated by those skilled in the art. Thus, a vehicle operator flips a switch to energize the motor 6. The motor turns the screw 14, which drives the nut 12 to its opposite limit. The pins 18 on the saddle 20 engage the yoke 16, causing the yoke to be rotated against the force imposed by the spring tensioning mechanism 22. The latter stores spring energy in the shifter unit 10, which, upon reduction of meshing axle gear torque, will enable the shifting of the axle gears from one axle speed to the other.

Figure 5:
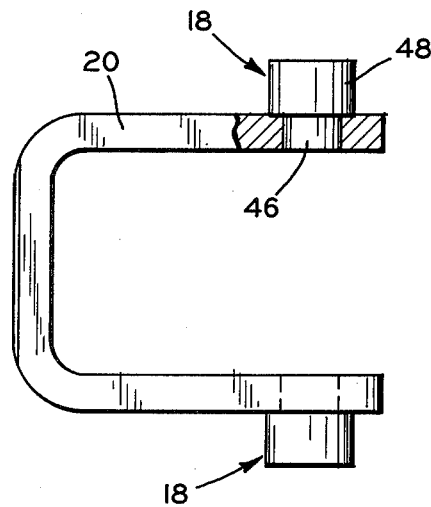
FIG. 5 is a view of a preferred embodiment of the saddle of this invention.

FIG. 5 shows a preferred embodiment of the load-bearing saddle 20 of this invention. As stated, the saddle 20 contains two pins 18, each disposed outwardly one side thereof for engagement with the slots 19 of yoke 16. Each of the pins 18 has a saddle mounting portion 46 and a yoke slot engaging portion 48, and is preferably welded to the saddle as shown.

Figure 6:
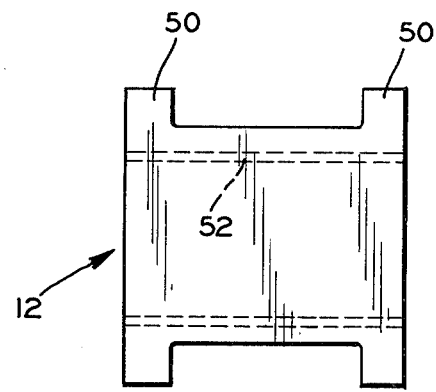
FIG. 6 is a view of a preferred embodiment of the nut of this invention.

The saddle 20 of FIG. 5 fits slidably over the nut 12 of FIG. 6, the nut 12 containing flanges 50 for axially constraining the saddle 20 to permit only radial movement thereof. The nut also contains an internally grooved portion 52 for balls 53, the balls being shown in phantom in FIG. 4. The balls 53 impart axial forces imposed by the screw to the nut 12, which is restrained from rotation but free to move axially on the screw shaft 14, whereby the pins 18 of saddle 20 impart relative rotation to the yoke 16, and hence to the spring winding lever 26, as explained.

Referring to FIG. 2, at the physical ends of the slots 19 are escapement ramps 54 which allow the pins 18 of saddle 20 to slide out of the slots 19 during freewheeling of the screw shaft 14, which occurs at each end of the actuator stroke. For this purpose, the ramps 54 have surfaces parallel to the screw shaft axis "a-a38 whenever the yoke 16 is at an extremity of its rotatable arc. Thus, there will be no axial loading of the saddle, nut, or screw during freewheeling because the pins 8 will be fully out of engagement with the yoke slots 19. Earlier, it was mentioned that the spring tensioner mechanism 22 (FIG. 3) store spring energy for release upon reduction of meshing axle gear torque. The spring energy thus stored gives rise to a radial component of force exerted via the yoke 16 on the pins 18. Referring to FIGS. 2 and 4, it will be apparent that such radial forces will be transmitted through the pins 18 and saddle 20 directly to the housing wall 56 of the shifter unit 10. As the saddle 20 directly abuts the housing wall 56, the latter wall will ultimately carry all radial forces borne by the saddle. As the saddle 20 slides along the wall 56 during shifting cycles, a certain minimal amount of wear is inevitable, notwithstanding that the sliding surfaces are bathed in lubrication. Even under conditions of wear, it will be appreciated the nut 12 and screw shaft 14 will not be subjected to radial loads, since the saddle, free to slide radially over the nut, will take up all slack due to wear.

The avoidance of all radial and axial loading on the nut 12 and screw shaft 14 during freewheeling will significantly reduce frictional forces between the aforesaid balls 53 and screw shaft 14, thus resulting in a greatly improved shifter unit life.

What is claimed is:

1. In a speed change mechanism having a gear change yoke actuable by a nut screw assembly, said nut being axially movable along said screw, said mechanism including a housing having internal walls; an improvement comprising a load bearing saddle mounted on the nut and engageable with said yoke, said saddle further comprising a radial load-bearing surface, wherein said surface is in sliding engagement with at least one of said internal walls of said housing.

2. The speed change mechanism of claim 1 wherein said yoke is rotatable between first and second limits of movement and wherein said yoke comprises means for relief of axial loads imposed by said nut and screw onto said yoke whenever said yoke is positioned at either of said first or second limits of movement.

3. The speed change mechanism of claim 2 wherein said saddle further comprises bosses disposed thereon for engagement of said yoke.

4. The speed change mechanism of claim 3 wherein said yoke further comprises slots for receiving said bosses on said saddle, said bosses providing actuation of said yoke between said first and second limits of movement.

5. The speed change mechanism of claim 4 wherein said means of said yoke for relief of axial loads imposed by said nut and screw onto said yoke comprise escapement ramps defining each end of each of said slots, whereby said bosses slide out of said slots at either of said first or second limits.

6. The speed change mechanism of claim 5 wherein said load-bearing saddle further comprises flanges radially positioned on said nut for allowing only radial movement of said saddle with respect to said nut.

7. The speed change mechanism of claim 6 wherein said bosses comprise pins disposed outwardly from opposite sides of said saddle, said pins being non-rotatably fixed to said saddle for actuation of said yoke.

* * * * *